Dec. 27, 1932.  A. N. BENN  1,891,907
APPARATUS FOR SMOKING MEAT
Filed Feb. 28, 1930
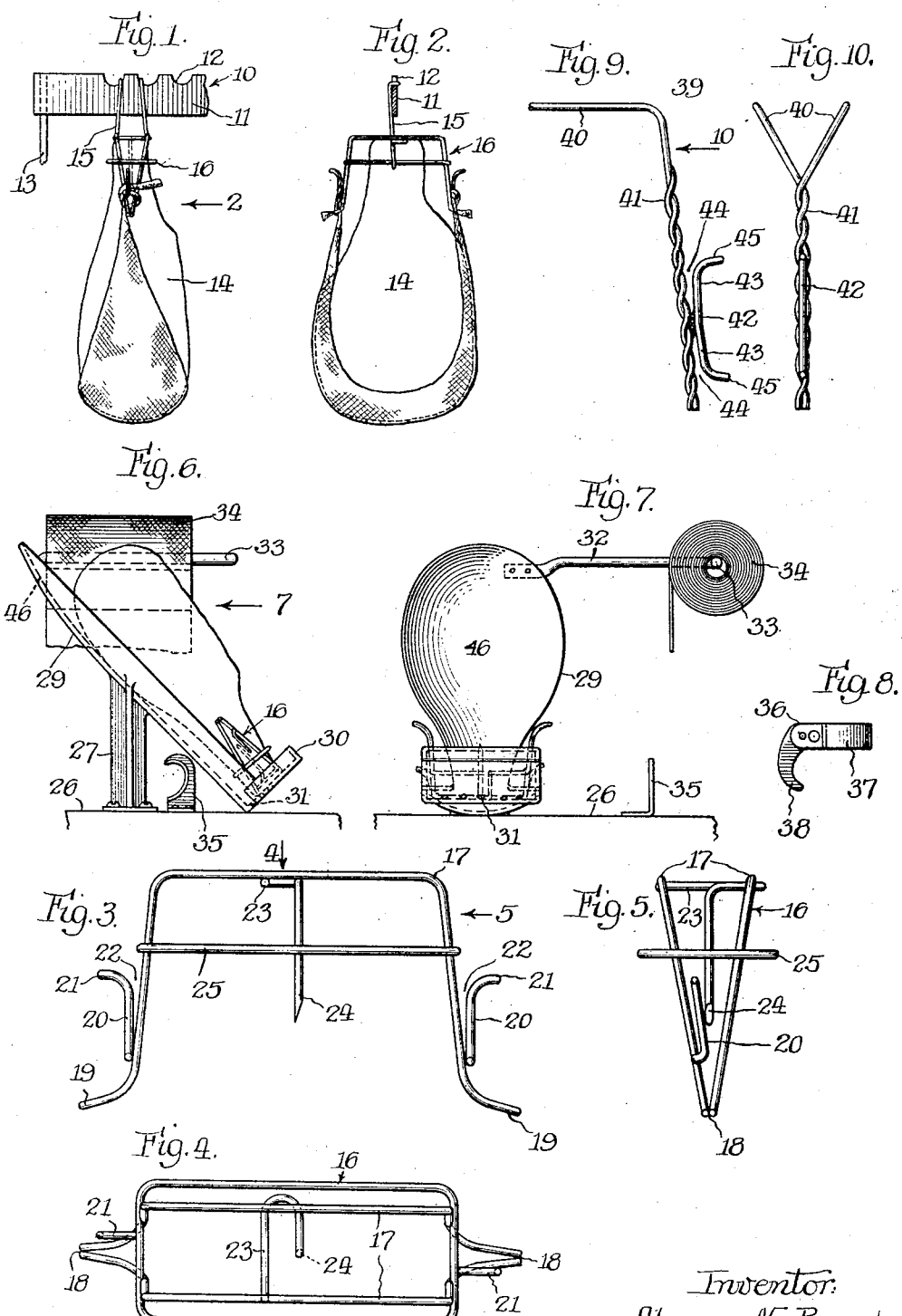

Patented Dec. 27, 1932

1,891,907

UNITED STATES PATENT OFFICE

ALONZO N. BENN, OF CHICAGO, ILLINOIS

APPARATUS FOR SMOKING MEAT

Application filed February 28, 1930. Serial No. 432,031.

My invention relates to an apparatus for smoking meat and is concerned more particularly with those classes of meat which are suspended during the smoking operation, although susceptible of adaptation to meats which are supported in other ways.

The principal object of my invention is to devise an apparatus for use in applying a smoking cloth to the portion of the meat which it is desired to protect during the smoking operation and to accomplish this result with ease, rapidity, and economy in the amount of cloth required, and the attainment of a characteristic, individual, shaping pressure which is determined solely by the degree of tautness with which the cloth is initially applied and is independent of any deforming tendency arising from gravity action on the meat in the event that the meat is suspended.

A further object is to devise an apparatus which comprises an arrangement carried by the meat and to which the ends of the smoking cloth are attached, generally prior to the positioning of the meat on a smokehouse trolley.

A further object is to devise a fixture for supporting the meat in a position convenient for the operator during the application of the smoking cloth, while at the same time facilitating the draining of excess pickling solution, the cloth being carried in roll form on the fixture in handy reaching distance and means being provided for severing the cloth in suitable lengths.

For purpose of illustration, my improved apparatus will be described as used in connection with a pork ham which it is contemplated will be suspended from a smokehouse trolley, but it will be understood that the broadest aspects of the invention contemplate its application to smoked meats in general, including hams of all kinds, picnics, shoulders and other types, and regardless of the manner in which the meat is supported during the smoking operation.

According to present methods, the meat is customarily hung from the rail of a smokehouse trolley and after being so positioned, a strip of smoking cloth is bound around the lower, or butt end, and the ends of the cloth secured either directly to the rail or to some other part which is carried by the trolley. The cloth generally sustains a portion of the weight of the meat and its purpose is to protect the meat against the direct action of the rising hot gases and also to initially shape the soft portions contacted, with a view of preventing the creation of drawn and distorted conditions during smoking and assuring the securement of full, symmetrical butt or lower ends. However, it is extremely difficult and practically impossible on a large scale of production to apply a smoking cloth to a suspended ham or other meat and maintain a uniform pressure against the butt end while securing the ends of the cloth, this condition being particularly true in the larger sizes of meats. The degree of pressure obtained under these circumstances is not susceptible of accurate control, since the tendency is either to support a portion of the weight of the meat by the cloth with a possible undesirable severity of pressure and consequent distortion, or to lose the original tautness of the cloth while tying the ends with a resulting decrease in the shaping pressure below that desired.

It is the express object of the present invention to devise an apparatus for use in applying a smoking cloth in which the characteristics of the meat provide the necessary standard for determining the shaping pressure, so that the butt ends of hams which have been smoked after being prepared according to my method, present a uniform and attractive appearance. Briefly, the method consists in drawing a smoking cloth around the end to be shaped as tightly as the conformation of the meat will permit, without undue distortion, and then securing the ends of the cloth to a novel skeleton structure which is carried by the meat as described more fully hereinafter. The meat is preferably so prepared prior to being suspended on the trolley by using a special form of fixture and it will be obvious that gravity action on the meat while suspended exerts no effect on the shaping pressure, so that a high degree of uniformity in the product is secured. The special member is particularly arranged to facilitate the rapid application and securement of the ends of the cloth, thus improving the production rate.

These and further objects of my invention will be set forth in the following specification, reference being had to the accompanying drawing, and the novel means by which said objects are effectuated will be definitely pointed out in the claims.

In the drawing:

Figure 1 is a partial elevation of a smoke-house trolley showing a pork ham suspended therefrom and arranged for smoking with my improved apparatus.

Fig. 2 is a sectional view of the trolley, looking in the direction of the arrow 2, the ham being shown in elevation.

Fig. 3 is an enlarged, side elevation of the skeleton member utilized to secure the ends of the smoking cloth.

Figs. 4 and 5 are plan and end views of the skeleton member, looking in the direction of the arrows 4 and 5, respectively, in Fig. 3.

Fig. 6 is a side elevation of the fixture which is employed to support the meat during the application of the cloth thereto, a ham being shown in outline.

Fig. 7 is a view of the fixture looking in the direction of the arrow 7 in Fig. 6.

Fig. 8 is an elevation of an accessory used by the operator in handling the meat after the attachment of the smoking cloth thereto.

Fig. 9 is a partial side elevation of a modified form of skeleton member.

Fig. 10 is an end view of the skeleton member shown in Fig. 9, looking in the direction of the arrow 10 in said figure.

The numeral 10 represents a portion of a smoke-house trolley which is provided with the usual horizontal bars 11 having the customary, spaced serrations, or notches, 12, and which are connected at their ends by the vertical upright 13. The precise construction of the trolley forms no part of the present invention, but however, arranged, it is contemplated that the ham 14 will be suspended from a convenient portion thereof, as from one of the bars 11, by a cord 15 in the usual manner. Prior to suspension, however, the ham will have applied thereto a skeleton member and a length of smoking cloth as will now be described.

The skeleton member 16 is applied to the shank end of the ham 14 and is preferably formed of wire as affording the necessary structural strength and characteristic type of functioning desired, without preventing the access of the hot gases and smoke to the uncovered surface of the ham. The member 16 comprises a pair of inverted, U-shaped lengths of wire 17 which are spaced from each other along their horizontal portions, as shown in Fig. 5, and the side portions of which may be directed toward each other in a V-shaped relation for joinder at their lower ends, as designated by the numeral 18 in Fig. 5, to form side arms of the skeleton member, and which lower ends are preferably bent outwardly to provide a pair of arms 19 for a purpose hereinafter explained. Attached to each one of the depending, side arms of the skeleton member at opposite sides thereof is an attaching prong 20 which is slightly offset outwardly from the adjacent portion of the member to provide a bight 22 which opens upwardly, as viewed in Fig. 3, and the upper end of which prong is bent outwardly to define a guiding arm 21. In order to effectually position the skeleton member and the shank end of the ham, a length of wire 23 is bridged between the horizontal portions of the wires 17 and a portion of the wire 23 is bent downwardly in a centrally disposed position with reference to the skeleton member 16 and is sharpened at its lower end to provide a spike 24. A strengthening frame 25, also formed of wire, is bent around the depending, side portions of the wires 17 a predetermined distance below the horizontal portions thereof to prevent spreading of said side portions and also slipping of the member from the shank end of the ham, or the shank or small ends of other pieces of meat.

An improved type of fixture is employed as an accessory in facilitating the mounting of the skeleton member 16 on the ham and the securement of the smoking cloth to said member, and said fixture comprises a base 26 which supports an upwardly extending arm 27 on which is carried an inclined shelf 29 which may be appropriately dished, as indicated by the numeral 46 in Fig. 6, for approximate conformation to the shape of the ham. At the lower end of the shelf 29, a pocket-shaped portion 30 projects therefrom and is provided with one or more drain holes 31 through which the excess pickling liquid passes in draining from the ham when the latter is in position on the fixture. An arm 32 is also carried by the shelf 29 and said arm in turn supports a shaft 33 which carries the roll of smoking cloth 34. The base 26 of the fixture also carries a knife 35 which serves as a means of severing the smoking cloth when the desired length thereof has been obtained from the roll 34.

In carrying out my improved method, the skeleton member 16 is placed on the fixture 26 with the horizontal portion thereof resting on the bottom of the pocket 30 and the side arms of said member extending upwardly in a general parallel relation to the bottom of the shelf 29. The ham 14 is then placed upon said shelf with the shank extending downwardly and toward the right, as viewed in Fig. 6, and said ham is then slid downwardly along said shelf to securely embed the spike 24 within the shank of the ham. In this position of the skeleton member 16, it will be noted that the attaching prongs 20 are directed downwardly toward the bottom of the pocket 30. The operator will then grasp the end of the smoking cloth which is hanging from roll 34, and after tying a knot at the end thereof, will carry the same across the butt end of the ham and downwardly along the left side thereof, as viewed in Fig. 7, whereupon said knotted end will be slid between the adjacent prong 20 and the side of member 16, where it will be securely held when pressure is applied by tightly drawing the banding or smoking cloth back over the butt of the ham or thick portion of other meats. The operator then cuts the smoking cloth to proper length by means of the fixed knife 35, and this end is then slid between the adjacent prong 20 and the side of the member 16; thence upwardly over the arm 19, then downwardly across said arm for reinsertion between said prong and the adjacent side of said member, a succession of movements which effectually secures the indicated end of the cloth in position through frictional contact of the cloth portions with each other and with the adjacent portions of the skeleton member, the character of securement being such as to increase the security of attachment as the pulling force on said cloth is increased. The ham having been strung with the cord 15 for hanging on the smoking trolley before the application of member 16 and the smoking cloth, the operator then employs the attachment 36 having a band portion 37 which is slipped on one of his fingers and the hooked portion 38 which is intended for engagement with the cord 15 in order to more easily disengage this cord from between the member 16 and the shank end of the ham so as to facilitate the operation of suspending the ham from the trolley 10 as shown in Fig. 1.

The smoking cloth is positioned to fulfill the usual requirements of elements of this character and it will be particularly observed that the mounting of the same on the ham can be effected with considerable ease and rapidity, which in conjunction with the facility with which the cloth may be adjusted and fixed in position to effect any desired initial shaping of the butt end of the meat, constitutes the principal features of my invention. In addition, this manner of applying the cloth to the ham results in a considerable saving in the amount of cloth required over the method now practiced in the industry, wherein it is necessary either to extend the cloth wholly up to one of the horizontal bars of the trolley for mounting thereto or in addition to extend the cloth along a portion of said bar until it reaches the next ham in position. The skeleton member 16 is characterized by simplicity of structure and is easily cleaned. Moreover, the fixture 26 affords a highly convenient manner of properly supporting the ham during the application of the skeleton member 16 and smoking cloth 34 thereto. The offset arrangement of the prongs 20 facilitates securement of the cloth, free of any interference with the meat, while the V-shaped side arms serve to approximate the correct positioning of the prongs with reference to the ham butt.

In the modified arrangement shown in Figs. 9 and 10, the skeleton member 39 comprises a pair of inverted, U-shaped wires 40 which are spaced from each other along their horizontal portions, as indicated in Fig. 10, and the depending sides of which are directed toward each other and spirally wound together to form strong, rigid sides 41. Secured to each side 41, is a prong 42 having a pair of oppositely disposed arms 43 extending along said sides and slightly offset therefrom to provide a pair of bights 44 for the reception of the smoking cloth, and the extreme ends of which are bent outwardly to define guide arms 45. As in the case of the member 16, it is contemplated that the skeleton member 39 will also be provided with a spike and a strengthening frame, corresponding generally to the similar elements 24 and 25, respectively, in the member 16. The manner of use of the skeleton member 39 is identical with that heretofore described for the member 16, except that the slightly different arrangement of the prongs 42 will necessitate a corresponding change in the manner in which the end of the smoking cloth is secured thereto. In this connection, it is contemplated that the free end of the smoking cloth, during the initial application thereof, will be first passed through that bight 44 which opens downwardly in the attaching position of said member corresponding to that shown for the member 16 in Fig. 6, and is thereafter looped through the other mouth 44 and across the outer face of the prong 42 in any desired criss-cross arrangement.

While I have shown one set of elements and combinations thereof for effectuating my improved apparatus for the preparation of meat for smoking, it will be understood that the same is intended for purpose of illustration only and in no wise to restrict my conceptions to the exact forms and structures shown, for many changes may be made therein without departing from the spirit of my invention.

I claim:

1. An apparatus in the form of a skeleton member for smoking meat comprising a pair of wires each bent into an intermediate portion for engaging one end of the meat and oppositely disposed end portions which together form arms extending downwardly along the sides of the meat, the extremities of said end portions being disposed in abutting relation, a third wire bent into a loop enclosing said arms below the plane of said intermediate portion, attaching prongs provided on said arms, and a smoking cloth secured at its ends to said prongs and bound around the opposite end of the meat.

2. An apparatus in the form of a skeleton member for smoking meat comprising a pair of wires each bent into an intermediate portion for engaging one end of the meat and oppositely disposed end portions which together form arms extending downwardly along the sides of the meat, the extremities of said end portions being disposed in abutting relation, a third wire bent into a loop enclosing said arms below the plane of said intermediate portion, attaching prongs externally offset from said arms to provide bights therewith, and a smoking cloth having its ends secured in said bights and bound around the opposite end of the meat.

3. An apparatus in the form of a skeleton member for smoking meat comprising a pair of wires each bent into an intermediate portion for engaging one end of the meat and oppositely disposed end portions which together form arms extending downwardly along the sides of the meat, an attaching spike disposed between said arms for embedding in the meat, prongs provided on said arms, and a smoking cloth secured at its ends to said prongs and bound around the opposite end of the meat.

4. An apparatus in the form of a skeleton member for smoking meat comprising a pair of spaced wires each bent into an intermediate portion for engaging one end of the meat and oppositely disposed end portions which together form arms extending downwardly along the sides of the meat, a wire arranged transversely of said intermediate portion and bent downwardly therefrom to form an attaching spike for embedding in the meat, prongs provided on said arms, and a smoking cloth secured at its ends to said prongs and bound around the opposite end of the meat.

5. An apparatus in the form of a skeleton member for smoking meat comprising a pair of wires each bent into an intermediate portion for engaging one end of the meat and oppositely disposed end portions which together form arms extending downwardly along the sides of the meat, attaching prongs provided on said arms, and a smoking cloth secured at its ends to said prongs and bound around the opposite end of the meat.

In testimony whereof, I have subscribed my name.

ALONZO N. BENN.